(12) United States Patent
Ward et al.

(10) Patent No.: US 10,845,812 B2
(45) Date of Patent: Nov. 24, 2020

(54) METHODS FOR CONTROLLING MOVEMENT OF A MARINE VESSEL NEAR AN OBJECT

(71) Applicant: Brunswick Corporation, Mettawa, IL (US)

(72) Inventors: Aaron J. Ward, Oshkosh, WI (US); Travis C. Malouf, Germantown, WI (US); Jason S. Arbuckle, Horicon, WI (US); Matthew E. Derginer, Butte des Mort, WI (US)

(73) Assignee: Brunswick Corporation, Mettawa, IL (US)

( * ) Notice: Subject to any disclaimer, the term of this patent is extended or adjusted under 35 U.S.C. 154(b) by 248 days.

(21) Appl. No.: 15/986,395

(22) Filed: May 22, 2018

(65) Prior Publication Data

US 2019/0361446 A1    Nov. 28, 2019

(51) Int. Cl.
| | | |
|---|---|---|
| *G05D 1/02* | (2020.01) | |
| *B63H 25/02* | (2006.01) | |
| *B63H 25/42* | (2006.01) | |

(52) U.S. Cl.
CPC .......... *G05D 1/0208* (2013.01); *B63H 25/02* (2013.01); *B63H 25/42* (2013.01); *B63H 2025/026* (2013.01)

(58) Field of Classification Search
CPC ...... G05D 1/0208; G05D 1/0206; B63C 1/04; G01C 21/203; B63H 2025/026;
(Continued)

(56) References Cited

U.S. PATENT DOCUMENTS

| 2,585,502 | A | 2/1952 | Schneider |
|---|---|---|---|
| 2,775,328 | A | 12/1956 | Yokel |
(Continued)

FOREIGN PATENT DOCUMENTS

| CA | 2279165 | 1/2001 |
|---|---|---|
| CA | 2282064 | 1/2001 |
(Continued)

OTHER PUBLICATIONS

Poorman et al., "Multilayer Control System and Method for Controlling Movement of a Marine Vessel", Unpublished U.S. Appl. No. 11/965,583, filed Dec. 27, 2007.
(Continued)

*Primary Examiner* — Dalena Tran
(74) *Attorney, Agent, or Firm* — Andrus Intellectual Property Law, LLP (57) ABSTRACT

A system controls movement of a marine vessel near an object. The system includes a control module in signal communication with a marine propulsion system, a manually operable input device providing a signal representing a requested translation of the marine vessel, and a sensor providing a first distance between the vessel and a first point on the object and a second distance between the vessel and a second point on the object. The control module determines an actual angle between the vessel and the object based on the first distance and the second distance. In response to the signal representing the requested translation, the control module stores the actual angle between the vessel and the object as an initial angle and controls the marine propulsion system to produce thrust that will carry out the requested translation and that will maintain the initial angle.

20 Claims, 6 Drawing Sheets

US 10,845,812 B2
Page 2

(58) Field of Classification Search
CPC ........ B63H 25/02; B63H 25/04; B63H 25/42;
B63H 21/21; B63J 2099/008; B63J 99/00;
B63B 2213/00; B63B 79/00; G08G 3/02
USPC ........ 701/21, 301; 114/144 A, 144 B, 144 R
See application file for complete search history.

(56) References Cited

U.S. PATENT DOCUMENTS

| | | | |
|---|---|---|---|
| 3,187,704 A | 6/1965 | Shatto, Jr. et al. | |
| 3,673,553 A | 6/1972 | Miura et al. | |
| 3,688,252 A | 8/1972 | Thompson | |
| 3,707,717 A | 12/1972 | Frielinghaus | |
| 3,715,571 A | 2/1973 | Braddon | |
| 3,771,483 A | 11/1973 | Spencer | |
| 4,009,678 A | 3/1977 | North | |
| 4,063,240 A * | 12/1977 | Isbister | G01S 13/874 342/21 |
| 4,220,111 A | 9/1980 | Krautkremer et al. | |
| 4,253,149 A | 2/1981 | Cunningham et al. | |
| 4,428,052 A | 1/1984 | Robinson et al. | |
| 4,513,378 A | 4/1985 | Antkowiak | |
| 4,519,335 A | 5/1985 | Krautkremer et al. | |
| 4,691,659 A | 9/1987 | Ito et al. | |
| 4,769,773 A | 9/1988 | Shatto, Jr. | |
| 4,939,661 A | 7/1990 | Barker et al. | |
| 4,975,709 A | 12/1990 | Koike | |
| 5,031,561 A | 7/1991 | Nilsson | |
| 5,090,929 A | 2/1992 | Rieben | |
| 5,108,325 A | 4/1992 | Livingston et al. | |
| 5,172,324 A | 12/1992 | Knight | |
| 5,202,835 A | 4/1993 | Knight | |
| 5,331,558 A | 7/1994 | Hossfield et al. | |
| 5,362,263 A | 11/1994 | Petty | |
| 5,386,368 A | 1/1995 | Knight | |
| 5,390,125 A | 2/1995 | Sennott et al. | |
| 5,432,515 A * | 7/1995 | O'Conner | G01S 7/003 340/984 |
| 5,491,636 A | 2/1996 | Robertson et al. | |
| 5,735,718 A | 4/1998 | Ekwall | |
| 5,736,962 A | 4/1998 | Tendler | |
| 5,755,605 A | 5/1998 | Asberg | |
| 5,884,213 A | 3/1999 | Carlson | |
| 6,059,226 A | 5/2000 | Cotton et al. | |
| 6,092,007 A | 7/2000 | Cotton et al. | |
| 6,142,841 A | 11/2000 | Alexander, Jr. et al. | |
| 6,230,642 B1 | 5/2001 | McKenney et al. | |
| 6,234,853 B1 | 5/2001 | Lanyi et al. | |
| 6,273,771 B1 | 8/2001 | Buckley et al. | |
| 6,308,651 B2 | 10/2001 | McKenney et al. | |
| 6,354,892 B1 | 3/2002 | Staerzl | |
| 6,357,375 B1 | 3/2002 | Ellis | |
| 6,377,889 B1 | 4/2002 | Soest | |
| 6,386,930 B2 | 5/2002 | Moffet | |
| 6,431,928 B1 | 9/2002 | Aarnivuo | |
| 6,446,003 B1 | 9/2002 | Green et al. | |
| 6,447,349 B1 | 9/2002 | Fadeley et al. | |
| 6,485,341 B1 | 11/2002 | Layni et al. | |
| 6,511,354 B1 | 1/2003 | Gonring et al. | |
| 6,604,479 B2 | 8/2003 | McKenney et al. | |
| 6,623,320 B1 | 9/2003 | Hedlund | |
| 6,677,889 B2 | 1/2004 | Van Rees et al. | |
| 6,678,589 B2 | 1/2004 | Robertson et al. | |
| 6,705,907 B1 | 3/2004 | Hedlund | |
| 6,707,414 B2 | 3/2004 | Van Rees et al. | |
| 6,712,654 B1 | 3/2004 | Putaansuu | |
| 6,757,606 B1 | 6/2004 | Gonring | |
| 6,848,382 B1 | 2/2005 | Bekker | |
| 6,978,729 B2 | 12/2005 | Bertetti et al. | |
| 6,994,046 B2 | 2/2006 | Kaji et al. | |
| 6,995,527 B2 | 2/2006 | Depasqua | |
| RE39,032 E | 3/2006 | Gonring et al. | |
| 7,131,385 B1 | 11/2006 | Ehlers et al. | |
| 7,220,153 B2 | 5/2007 | Okuyama | |
| 7,261,605 B2 | 8/2007 | Misao et al. | |
| 7,267,068 B2 | 9/2007 | Bradley et al. | |
| 7,268,703 B1 | 9/2007 | Kabel et al. | |
| 7,305,928 B2 | 12/2007 | Bradley et al. | |
| 7,366,593 B2 | 4/2008 | Fujimoto et al. | |
| 7,389,735 B2 | 6/2008 | Kaji et al. | |
| 7,398,742 B1 | 7/2008 | Gonring | |
| 7,416,458 B2 | 8/2008 | Suemori et al. | |
| 7,429,202 B2 | 9/2008 | Yazaki et al. | |
| 7,455,557 B2 | 11/2008 | Mizutani | |
| 7,467,595 B1 | 12/2008 | Lanyi et al. | |
| 7,476,134 B1 | 1/2009 | Fell et al. | |
| 7,538,511 B2 | 5/2009 | Samek | |
| 7,561,886 B1 | 7/2009 | Gonring et al. | |
| 7,577,526 B2 | 8/2009 | Kim et al. | |
| 7,727,036 B1 | 6/2010 | Poorman et al. | |
| 7,813,844 B2 | 10/2010 | Gensler et al. | |
| 7,876,430 B2 | 1/2011 | Montgomery | |
| 7,883,383 B2 | 2/2011 | Larsson | |
| 8,050,630 B1 | 11/2011 | Arbuckle | |
| 8,082,100 B2 | 12/2011 | Grace et al. | |
| 8,145,370 B2 | 3/2012 | Borrett | |
| 8,145,371 B2 | 3/2012 | Rae et al. | |
| 8,155,811 B2 | 4/2012 | Noffsinger et al. | |
| 8,215,252 B1 | 7/2012 | Chun | |
| 8,265,812 B2 | 9/2012 | Pease | |
| 8,417,399 B2 | 4/2013 | Arbuckle et al. | |
| 8,439,800 B1 | 5/2013 | Bazan et al. | |
| 8,478,464 B2 | 7/2013 | Arbuckle et al. | |
| 8,480,445 B2 | 7/2013 | Morvillo | |
| 8,510,028 B2 | 8/2013 | Grace et al. | |
| 8,515,660 B2 | 8/2013 | Grace et al. | |
| 8,515,661 B2 | 8/2013 | Grace et al. | |
| 8,527,192 B2 | 9/2013 | Grace et al. | |
| 8,543,324 B2 | 9/2013 | Grace et al. | |
| 8,622,778 B2 | 1/2014 | Tyers et al. | |
| 8,645,012 B2 | 2/2014 | Salmon et al. | |
| 8,694,248 B1 | 4/2014 | Arbuckle et al. | |
| 8,761,976 B2 | 6/2014 | Salmon et al. | |
| 8,777,681 B1 | 7/2014 | McNalley et al. | |
| 8,797,141 B2 | 8/2014 | Best et al. | |
| 8,807,059 B1 | 8/2014 | Samples et al. | |
| 8,831,868 B2 | 9/2014 | Grace et al. | |
| 8,924,054 B1 | 12/2014 | Arbuckle et al. | |
| 9,039,468 B1 | 5/2015 | Arbuckle et al. | |
| 9,067,664 B2 * | 6/2015 | Yuet | G05D 1/0206 |
| 9,114,865 B1 | 8/2015 | Gonring | |
| 9,132,900 B2 | 9/2015 | Salmon et al. | |
| 9,132,903 B1 | 9/2015 | Gable et al. | |
| 9,162,743 B2 | 10/2015 | Grace et al. | |
| 9,176,215 B2 | 11/2015 | Nikitin et al. | |
| 9,183,711 B2 | 11/2015 | Fiorini et al. | |
| 9,195,234 B2 | 11/2015 | Stephens | |
| 9,248,898 B1 | 2/2016 | Kirchhoff | |
| 9,355,463 B1 | 5/2016 | Arambel et al. | |
| 9,359,057 B1 | 6/2016 | Andrasko et al. | |
| 9,377,780 B1 | 6/2016 | Arbuckle et al. | |
| 9,615,006 B2 | 4/2017 | Terre et al. | |
| 9,676,464 B2 | 6/2017 | Johnson et al. | |
| 9,694,885 B2 | 7/2017 | Combee | |
| 9,729,802 B2 | 8/2017 | Frank et al. | |
| 9,733,645 B1 | 8/2017 | Andrasko et al. | |
| 9,734,583 B2 | 8/2017 | Walker et al. | |
| 9,996,083 B2 | 1/2018 | Vojak | |
| 9,904,293 B1 | 2/2018 | Heap et al. | |
| 9,927,520 B1 | 3/2018 | Ward et al. | |
| 10,055,648 B1 | 8/2018 | Grigsby et al. | |
| 10,106,238 B2 | 10/2018 | Sidki et al. | |
| 10,191,153 B2 | 1/2019 | Gatland | |
| 10,431,099 B2 | 1/2019 | Stewart et al. | |
| 10,281,917 B2 | 5/2019 | Tyers | |
| 10,338,800 B2 | 7/2019 | Rivers et al. | |
| 10,444,349 B2 | 10/2019 | Gatland | |
| 2003/0137445 A1 | 7/2003 | Van Rees et al. | |
| 2003/0191562 A1 | 10/2003 | Robertson | |
| 2004/0221787 A1 | 11/2004 | McKenney et al. | |
| 2005/0170713 A1 | 8/2005 | Okuyama | |
| 2006/0089794 A1 | 4/2006 | Despasqua | |
| 2006/0116796 A1 | 6/2006 | Fossen et al. | |
| 2007/0017426 A1 | 1/2007 | Kaji et al. | |
| 2007/0032923 A1 | 2/2007 | Mossman et al. | |

(56) References Cited

U.S. PATENT DOCUMENTS

| | | |
|---|---|---|
| 2007/0089660 A1 | 4/2007 | Bradley |
| 2007/0162207 A1 | 7/2007 | Shimo et al. |
| 2007/0178779 A1 | 8/2007 | Takada et al. |
| 2007/0203623 A1 | 8/2007 | Saunders et al. |
| 2007/0233389 A1 | 10/2007 | Stephens |
| 2008/0033603 A1 | 2/2008 | Gensler et al. |
| 2008/0289558 A1 | 11/2008 | Montgomery |
| 2009/0037040 A1 | 2/2009 | Salmon et al. |
| 2009/0171520 A1 | 7/2009 | Kaji |
| 2009/0276148 A1 | 11/2009 | Ardvisson |
| 2010/0023192 A1 | 1/2010 | Rae et al. |
| 2010/0076683 A1 | 3/2010 | Chou |
| 2010/0109944 A1 | 5/2010 | Whitehead et al. |
| 2010/0138083 A1 | 6/2010 | Kaji |
| 2010/0145558 A1 | 6/2010 | Kaji |
| 2011/0153126 A1 | 6/2011 | Arbuckle et al. |
| 2011/0166724 A1 | 7/2011 | Hiramatsu |
| 2012/0072059 A1 | 3/2012 | Glaeser |
| 2012/0129410 A1 | 5/2012 | Tyers |
| 2012/0248259 A1 | 10/2012 | Page et al. |
| 2013/0080044 A1 | 3/2013 | Tyers et al. |
| 2013/0297104 A1 | 11/2013 | Tyers et al. |
| 2015/0089427 A1 | 3/2015 | Akuzawa |
| 2015/0277442 A1 | 10/2015 | Ballou |
| 2015/0346722 A1 | 12/2015 | Herz et al. |
| 2015/0346730 A1 | 12/2015 | Stephens et al. |
| 2016/0101838 A1 | 4/2016 | Kojima |
| 2016/0125739 A1 | 5/2016 | Stewart et al. |
| 2016/0214534 A1 | 7/2016 | Richards et al. |
| 2016/0246300 A1 | 8/2016 | Langford-Wood |
| 2016/0252907 A1 | 9/2016 | Parkinson |
| 2016/0334792 A1 | 11/2016 | Jopling |
| 2017/0205828 A1 | 7/2017 | Estabrook |
| 2017/0205829 A1 | 7/2017 | Tyers |
| 2017/0210449 A1 | 7/2017 | Frisbie et al. |
| 2017/0253314 A1 | 9/2017 | Ward |
| 2017/0255200 A1 | 9/2017 | Arbuckle et al. |
| 2017/0255201 A1 | 9/2017 | Arbuckle et al. |
| 2017/0277189 A1 | 9/2017 | Johnson et al. |
| 2017/0349257 A1 | 12/2017 | Hara et al. |
| 2017/0365175 A1 | 12/2017 | Harnett |
| 2018/0015994 A1 | 1/2018 | Kishimoto et al. |
| 2018/0057132 A1 | 3/2018 | Ward et al. |
| 2018/0259338 A1 | 9/2018 | Stokes et al. |
| 2018/0259339 A1 | 9/2018 | Johnson et al. |
| 2019/0251356 A1 | 8/2019 | Rivers |
| 2019/0258258 A1 | 8/2019 | Tyers |

FOREIGN PATENT DOCUMENTS

| | | |
|---|---|---|
| DE | 906907 C | 3/1954 |
| EP | 0423901 A1 | 4/1991 |
| EP | 2161542 A1 | 3/2010 |
| GB | 1173442 A | 12/1969 |
| GB | 2180374 A | 3/1987 |
| JP | S58061097 A | 4/1983 |
| JP | H04101206 A | 2/1992 |
| JP | 05-203638 A | 8/1993 |
| JP | H07223591 A | 8/1995 |
| JP | 2926533 B2 | 7/1997 |
| JP | 11-129978 A | 5/1999 |
| JP | 2002173091 A | 6/2002 |
| JP | 2003276677 A | 10/2003 |
| JP | 2006137309 A | 6/2006 |
| JP | 2007248336 A | 9/2007 |
| JP | 2008201225 A | 9/2008 |
| JP | 2009227035 A | 10/2009 |
| JP | 2009-538782 A | 11/2009 |
| JP | 2011128943 A | 6/2011 |
| JP | 5042906 B2 | 7/2012 |
| JP | 5226355 B2 | 7/2013 |
| JP | 2014065495 A | 4/2014 |
| KR | 20060072293 A | 6/2006 |
| WO | WO 1992005505 A1 | 4/1992 |
| WO | WO 2006058400 A1 | 6/2006 |
| WO | WO 2008111249 A1 | 8/2008 |
| WO | 2016104031 A1 | 6/2016 |
| WO | WO 2017095235 A1 | 6/2017 |
| WO | 2017167905 | 10/2017 |
| WO | 2018162933 | 9/2018 |
| WO | 2018183777 | 10/2018 |
| WO | 2018201097 | 11/2018 |
| WO | 2018232376 | 12/2018 |
| WO | 2018232377 | 12/2018 |
| WO | 2019096401 | 5/2019 |
| WO | 2019126755 | 6/2019 |
| WO | 2019157400 | 8/2019 |
| WO | 2019201945 | 10/2019 |

OTHER PUBLICATIONS

Arbuckle et al., "System and Method for Controlling a Position of a Marine Vessel Near an Object," Unpublished U.S. Appl. No. 15/818,233, filed Nov. 20, 2017.

Arbuckle et al., "System and Method for Controlling a Position of a Marine Vessel Near an Object," Unpublished U.S. Appl. No. 15/818,226, filed Nov. 20, 2017.

\* cited by examiner

METHODS FOR CONTROLLING MOVEMENT OF A MARINE VESSEL NEAR AN OBJECT

FIELD

The present disclosure relates to systems and methods for controlling movement of a marine vessel in a body of water.

BACKGROUND

U.S. Pat. No. 6,234,853 discloses a docking system that utilizes the marine propulsion unit of a marine vessel, under the control of an engine control unit that receives command signals from a joystick or push button device, to respond to a maneuver command from the marine operator. The docking system does not require additional propulsion devices other than those normally used to operate the marine vessel under normal conditions. The docking or maneuvering system of the present invention uses two marine propulsion units to respond to an operator's command signal and allows the operator to select forward or reverse commands in combination with clockwise or counterclockwise rotational commands either in combination with each other or alone U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,267,068 discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 7,305,928 discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 9,927,520 discloses a method of detecting a collision of the marine vessel, including sensing using distance sensors to determine whether an object is within a predefined distance of a marine vessel, and determining a direction of the object with respect to the marine vessel. The method further includes receiving a propulsion control input at a propulsion control input device, and determining whether execution of the propulsion control input will result in any portion of the marine vessel moving toward the object. A collision warning is then generated.

U.S. Patent Application Publication No. 2017/0253314 discloses a system for maintaining a marine vessel in a body of water at a selected position and orientation, including a global positioning system that determines a global position and heading of the vessel and a proximity sensor that determines a relative position and bearing of the vessel with respect to an object near the vessel. A controller operable in a station keeping mode is in signal communication with the GPS and the proximity sensor. The controller chooses between using global position and heading data from the GPS and relative position and bearing data from the proximity sensor to determine if the vessel has moved from the selected position and orientation. The controller calculates thrust commands required to return the vessel to the selected position and orientation and outputs the thrust commands to a marine propulsion system, which uses the thrust commands to reposition the vessel.

U.S. Patent Application Publication No. 2018/0057132 discloses a method for controlling movement of a marine vessel near an object, including accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

Each of the above-mentioned references is hereby incorporated by reference in its entirety.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a method is disclosed for controlling movement of a marine vessel near an object, the marine vessel being propelled by thrust generated by a marine propulsion system according to commands from a control module. The method includes determining if a sensor on the vessel has enough information about the object such that an actual angle between the vessel and the object can be determined. The method also includes receiving, with the control module, a signal representing a requested translation of the vessel from a manually operable input device. Thereafter, the method includes doing one of the following: in response to the sensor having enough information about the object, determining the actual angle between the vessel and the object when the signal representing the requested translation was received, storing the actual angle as an initial angle, and controlling the marine propulsion system with the control module to produce thrust that will carry out the requested translation and that will maintain the initial angle; or, in response to the sensor not having enough information about the object, controlling the marine propulsion system with the control module to produce thrust that will carry out the requested translation.

According to another example of the present disclosure, a system is disclosed for controlling movement of a marine vessel near an object, the marine vessel being propelled by thrust generated by a marine propulsion system. The system includes a control module in signal communication with the marine propulsion system, a manually operable input device providing to the control module a signal representing a requested translation of the marine vessel, and at least one sensor providing to the control module at least a first distance between the vessel and a first point on the object and a second distance between the vessel and a second point on the object. The control module determines an actual angle between the vessel and the object based on the first distance and the second distance. In response to the signal representing the requested translation, the control module stores the actual angle between the vessel and the object as an initial angle and controls the marine propulsion system to produce thrust that will carry out the requested translation and that will maintain the initial angle.

BRIEF DESCRIPTION OF DRAWINGS

Examples of systems and methods for controlling movement of a marine vessel are described with reference to the following Figures. The same numbers are used throughout the Figures to reference like features and like components.

DETAILED DESCRIPTION OF DRAWINGS

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible within the scope of the appended claims. Each limitation in the appended claims is intended to invoke interpretation under 35 USC § 112(f), only if the terms "means for" or "step for" are explicitly recited in the respective limitation.

Figure 1:
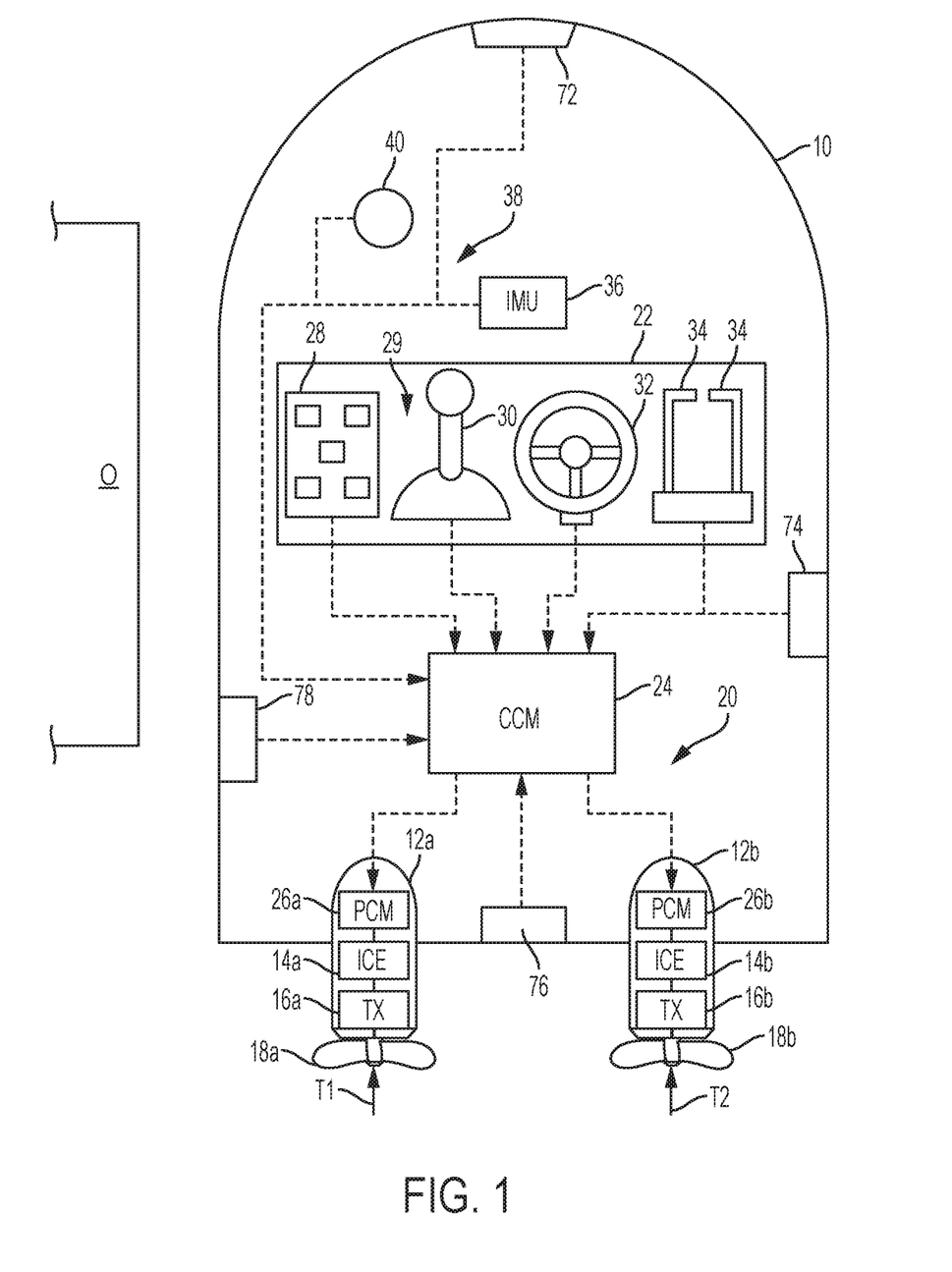
FIG. 1 is a schematic representation of a control system on a marine vessel.

FIG. 1 shows a marine vessel 10. The marine vessel 10 is capable of operating, for example, in a normal operating mode, a waypoint tracking mode, an auto heading mode, a station keeping mode, and a joysticking mode, among other modes, as described herein below. The vessel 10 has first and second propulsion devices 12a, 12b that produce first and second thrusts T1, T2 to propel the vessel 10, as will be more fully described herein below. As illustrated, the first and second propulsion devices 12a, 12b are outboard motors, but they could alternatively be inboard motors, stern drives, jet drives, or pod drives. Each propulsion device is provided with an engine 14a, 14b operatively connected to a transmission 16a, 16b, in turn operatively connected to a propeller 18a, 18b.

The vessel 10 also includes various control elements that make up a marine propulsion system 20. The marine propulsion system 20 comprises an operation console 22 in signal communication, for example via a CAN bus as described in U.S. Pat. No. 6,273,771, with a control module 24, such as for example a command control module (CCM), and with propulsion control modules (PCM) 26a, 26b associated with the respective propulsion devices 12a, 12b. Each of the control module 24 and the PCMs 26a, 26b may include a memory and a programmable processor. As is conventional, the processor can be communicatively connected to a computer readable medium that includes volatile or nonvolatile memory upon which computer readable code is stored. The processor can access the computer readable code, and the computer readable medium upon executing the code carries out functions as described herein below. In other examples of the marine propulsion system 20, only one control module is provided for the system rather than having both a CCM and PCMs. In other examples, one CCM is provided for each propulsion device, and/or additional control modules are provided for controlling engine speed and functions separately from steering and trim of the propulsion devices. For example, the PCMs 26a, 26b may control the engines 14a, 14b and transmissions 16a, 16b of the propulsion devices 12a, 12b, while additional thrust vector modules (TVMs) may control their orientation. In other examples of the marine propulsion system 20, the vessel control elements are connected via wireless communication rather than by a serially wired CAN bus. It should be noted that the dashed lines shown in FIG. 1 are meant to show only that the various control elements are capable of communicating with one another, and do not represent actual wiring connecting the control elements, nor do they represent the only paths of communication between the elements.

The operation console 22 includes a number of user input devices, such as a keypad 28, a joystick 30, a steering wheel 32, and one or more throttle/shift levers 34. Each of these devices inputs commands to the control module 24. The control module 24 in turn communicates with the first and second propulsion devices 12a, 12b by communicating with the PCMs 26a, 26b. The control module 24 also receives information from an inertial measurement unit (IMU) 36. The IMU 36 comprises a portion of a global positioning system (GPS) 38 which, in the example shown, also comprises a GPS receiver 40 located at a pre-selected fixed position on the vessel 10, which provides information related to the global position of the vessel 10. Signals from the GPS receiver 40 and the IMU 36 are provided to the control module 24. In one example, the IMU 36 can be a solid state, rate gyro electronic compass that detects the direction of the Earth's magnetic field using solid state magnetometers and indicates the marine vessel heading relative to magnetic north.

The steering wheel 32 and the throttle/shift levers 34 function in the conventional manner, such that rotation of the steering wheel 32 for example activates a transducer that provides a signal to the control module 24 regarding a desired direction of the vessel 10. The control module 24 in turn sends signals to the PCMs 26a, 26b (and/or TVMs or additional modules if provided), which in turn activate steering actuators to achieve desired orientations of the propulsion devices 12a, 12b. The propulsion devices 12a, 12b are independently steerable about their steering axes. The throttle/shift levers 34 send signals to the control module 24 regarding the desired gear (forward, reverse, or neutral) of the transmissions 16a, 16b and the desired rotational speed of the engines 14a, 14b of the propulsion devices 12a, 12b. The control module 24 in turn sends signals to the PCMs 26a, 26b, which in turn activate electromechanical actuators in the transmissions 16a, 16b and engines 14a, 14b for shift and throttle, respectively. A manually operable input device, such as the joystick 30, can also be used to provide signals to the control module 24. The joystick 30 can be used to allow the operator of the vessel 10 to manually maneuver the vessel 10, such as to achieve translation or rotation of the vessel 10, as will be described below. It should be understood that in alternative examples, the various components 28, 30, 32, 34 may communicate directly with the PCMs 26a, 26b or may communicate with one or more central control modules.

Figure 2:
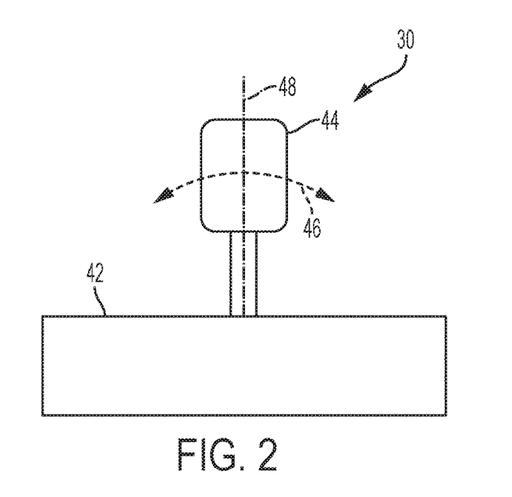
FIG. 2 is a side view of a joystick used in conjunction with the marine vessel of the present disclosure.
Figure 3:
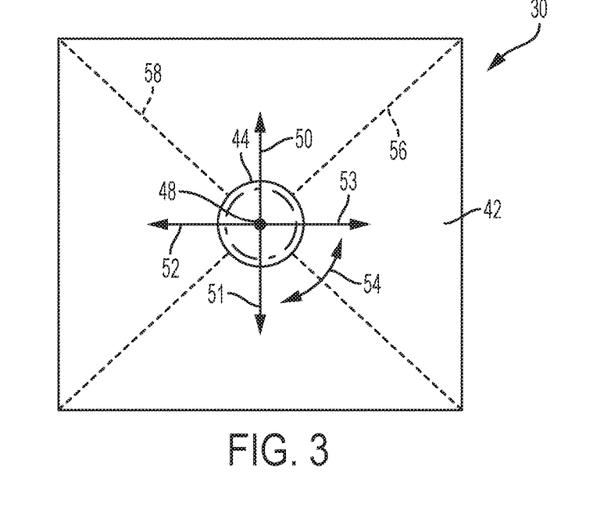
FIG. 3 is a top view of the joystick.

Referring to FIGS. 2 and 3, operation of the joystick 30 will now be described. FIG. 2 is a simplified schematic representation of the joystick 30 which provides a manually operable input device which can be used to provide a signal that is representative of a desired movement, selected by an operator, of the vessel 10. The example in FIG. 2 shows a base portion 42 and a handle 44 which can be manipulated by hand. In a typical application, the handle 44 is movable in the direction generally represented by arrow 46 and is also rotatable about an axis 48. It should be understood that the joystick handle 44 is movable by tilting it about its connection point in the base portion 42 in virtually any direction. Although arrow 46 is illustrated in the plane of the drawing in FIG. 2, a similar type of movement is possible in other directions that are not parallel to the plane of the drawing.

FIG. 3 is a top view of the joystick 30. The handle 44 can move, as indicated by arrow 46 in FIG. 2, in various directions which include those represented by arrows 50, 51, 52 and 53. However, it should be understood that the handle 44 can move in any direction relative to its axis 48 and is not limited to the two lines of movement represented by arrows 50, 51, 52 and 53. In fact, the movement of the handle 44 has a virtually infinite number of possible paths as it is tilted about its connection point within the base portion 42. The handle 44 is also rotatable about axis 48, as represented by arrow 54. Note that there are many different types of joystick devices that can be used to provide a signal that is representative of a desired movement of the vessel 10, as expressed by the operator of the marine vessel through movement of the handle 44. For example, a keypad, track ball, and/or other similar input device that allows inputs in four or more directions could be used.

With continued reference to FIG. 3, it can be seen that the operator can demand a purely linear movement either toward port as represented by arrow 52 or starboard as represented by arrow 53, a purely linear movement in a forward direction as represented by arrow 50 or reverse direction as represented by arrow 51, or any combination of two of these directions. In other words, by moving the handle 44 along dashed line 56, a linear movement toward the right side and forward or toward the left side and rearward can be commanded. Similarly, a linear movement along line 58 could be commanded. It should be understood that the operator of the marine vessel can also request a combination of sideways or forward/reverse linear movement in combination with a rotation as represented by arrow 54. Any of these possibilities can be accomplished through use of the joystick 30, which communicates with the control module 24 and eventually with the PCMs 26a, 26b. The magnitude, or intensity, of movement represented by the position of the handle 44 is also provided as an output from the joystick 30. In other words, if the handle 44 is moved slightly toward one side or the other, the commanded thrust in that direction is less than if, alternatively, the handle 44 was moved by a greater magnitude away from its vertical position with respect to the base portion 42. Furthermore, rotation of the handle 44 about axis 48, as represented by arrow 54, provides a signal representing the intensity of desired movement. A slight rotation of the handle 44 about axis 48 would represent a command for a slight rotational thrust about a preselected point on the vessel 10. On the other hand, a more intense rotation of the handle 44 about its axis 48 would represent a command for a higher magnitude of rotational thrust.

The joystick 30 can also provide information to the control module 24 regarding its being in an active state or an inactive state. While an operator is manipulating the joystick 30, the joystick 30 is in an active state. However, if the operator releases the joystick 30 and allows its handle 44 to return to a centered/upright and neutral position, the joystick 30 reverts to an inactive state. In one example, movement of the handle 44 away from the centered state or rotation of the handle 44 about its axis 48, or both, causes the control module 24 to determine that the joystick 30 is in the active state and to subsequently act on the commands from the joystick 30, regardless of the position of the throttle/shift levers 34 or steering wheel 32. In another example, either or both of the throttle/shift levers 34 and steering wheel 32 must be in a detent position before movement of the joystick 30 will result in the control module 24 determining that the joystick 30 is in the active state and subsequently acting on the commands from the joystick 30. In one example, the detent position of the throttle/shift levers 34 is a forward detent position or a neutral detent position. The detent position of the steering wheel 32 may be a zero-degree position. In another example, the transmissions 16a, 16b must both be in neutral before the joysticking mode can be enabled.

Thus, in a joysticking mode, the user may operate the joystick 30 to command the rotational and/or translational movements described herein above with respect to FIGS. 2 and 3. It should be understood that the joysticking mode is also intended to cover embodiments in which other types of input devices are used to provide fore/aft and lateral translation requests, for example, a keypad with fore/aft and left/right buttons. In another mode, the throttle/shift levers 34 and the steering wheel 32 can be used to send commands to the PCMs 26a, 26b via the control module 24 to operate the propulsion devices 12a, 12b in response to such commands, as is conventional to those having ordinary skill in the art. Further, the control module 24 may also be connected in signal communication with PCMs 26a, 26b in order to control the first and second propulsion devices 12a, 12b in an alternative autoheading mode such that the vessel 10 maintains a desired heading despite the presence of wind, waves, current, or other external factors force the vessel 10 off course. Alternatively, the operator could operate the marine vessel 10 in a waypoint tracking mode, in which the vessel 10 is propelled from one waypoint (geographical coordinate) to another at a heading calculated to reach the desired waypoint. A station keeping mode that maintains a desired global position and a desired heading of the vessel 10 can also be activated via the desired movement operational section 29.

In order to maintain the desired heading of the vessel 10, the control module 24 must have comparative information regarding the desired heading and the actual heading and/or course of the vessel. The control module 24 compares the actual heading and/or course of the vessel 10 detected by, for example, the IMU 36, with the desired heading input by the operator or calculated based on a desired waypoint. If for example, the difference between the desired heading and the actual heading and/or course exceeds a certain threshold value, the control module 24 may position the propulsion devices 12a, 12b and/or change the thrust provided by either of the propulsion devices 12a, 12b in order to correct and thereafter maintain the heading at the desired value. For example, the control module 24 can send a signal via the CAN bus to the PCMs 26a, 26b to set angles of rotation of the first and second propulsion devices 12a, 12b with respect to the vessel 10, to set engine speed, and/or to set shift position based on the required movement of the vessel 10 to achieve the desired heading.

Figure 4:
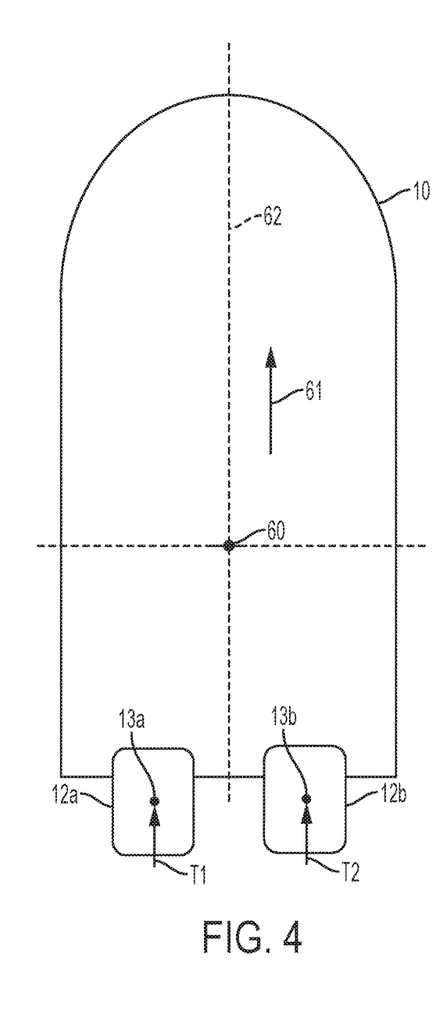
FIG. 4 illustrates an arrangement of thrust vectors during forward movement of the marine vessel.

In FIG. 4, the vessel 10 is illustrated schematically with its center of gravity 60, which can be a calibrated preselected point on the vessel 10. In other examples, point 60 could instead be an instantaneous center of turn. The center of turn is a function of several factors which comprise the speed of the vessel 10 as it moves through the water, the hydrodynamic forces on the hull of the vessel 10, the weight distribution of the load contained within the vessel 10, and the degree to which the vessel 10 is disposed below the waterline. The location of the center of turn can be empirically determined for various sets of conditions. For purposes of the below explanation, the point 60 will be referred to as the center of gravity, although similar calculations can be carried out using the center of turn.

First and second steering axes, 13a and 13b, are illustrated for the first and second propulsion devices 12a, 12b. The first and second propulsion devices 12a, 12b are rotatable about the first and second steering axes, 13a and 13b, respectively. The ranges of rotation of the first and second propulsion devices 12a, 12b may be symmetrical with respect to a centerline 62 of the vessel 10. The positioning method of the present disclosure rotates the first and second propulsion devices 12a, 12b about their respective steering axes 13a, 13b, adjusts their operation in forward or reverse gear, and adjusts the magnitude of their thrusts T1, T2 (for example, by adjusting engine speed and/or propeller pitch or transmission slip) in an efficient manner that allows rapid and accurate maneuvering of the vessel 10. The rotation, gear, and thrust magnitude of one propulsion device 12a can be varied independently of the rotation, gear, and thrust magnitude of the other propulsion device 12b.

FIG. 4 illustrates a thrust orientation that is used when it is desired to move the vessel 10 in a forward direction represented by arrow 61, with no movement in either a right or left direction and no rotation about its center of gravity 60. This is done by rotating the first and second propulsion devices 12a, 12b into an aligned position, in which their thrust vectors T1 and T2 are parallel to one another. As can be seen in FIG. 4, the first and second thrust vectors, T1 and T2, are equal in magnitude and are directed in the same forward direction. This creates no resultant rotation about the center of gravity 60 and no resultant movement in either the left or right directions. Movement in the direction represented by arrow 61 results from all of the vector components (described further herein below) of the first and second thrust vectors T1, T2 being resolved in a direction parallel to arrow 61. The resultant thrust components parallel to arrow 61 are additive and together provide net forward thrust in the direction of arrow 61 to the vessel 10.

Figure 5:
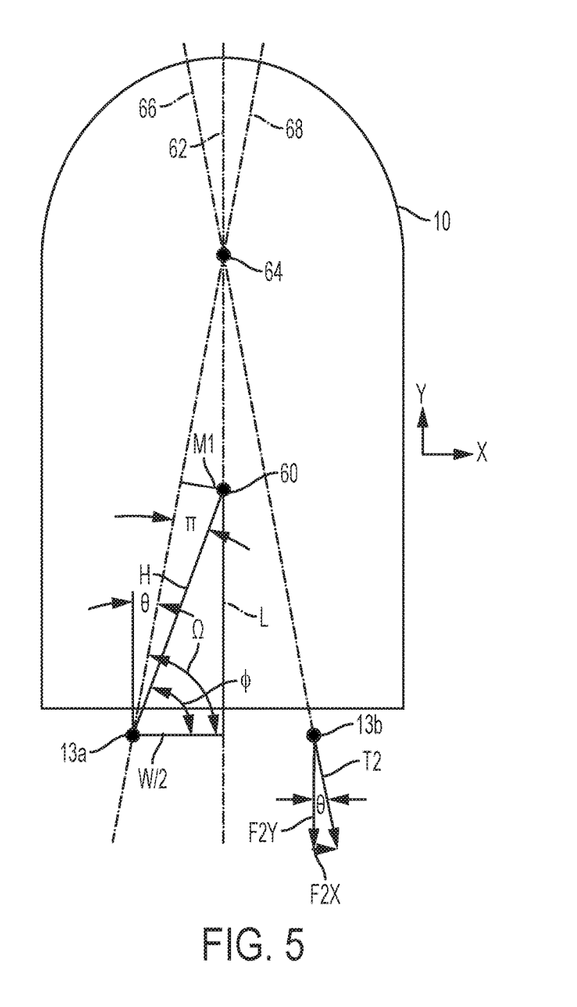
FIGS. 5 and 6 show arrangements of thrust vectors used to rotate the marine vessel about its center of gravity.
Figure 6:
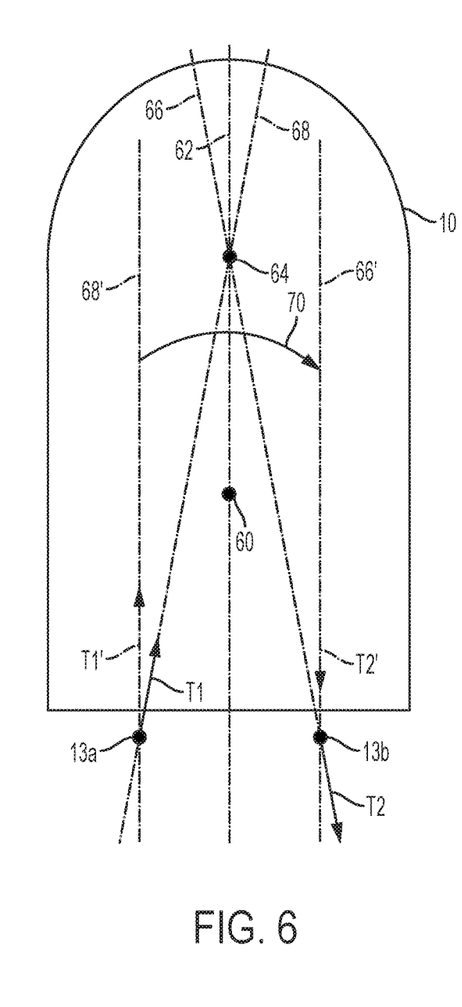

As illustrated in FIGS. 5 and 6, when a rotation of the vessel 10 is desired in combination with linear movement, the first and second propulsion devices 12a, 12b are rotated about the respective first and second steering axes 13a, 13b to steering angles θ with respect to the centerline 62 so that their thrust vectors intersect at a point on the centerline 62. Although thrust vector T1 is not shown in FIG. 5 for purposes of clarity (see FIG. 6 for its magnitude and direction), its associated line of action 68 is shown intersecting with a line of action 66 of thrust vector T2 at a point 64. Because the point 64 is not coincident with the center of gravity 60, an effective moment arm M1 exists with respect to the thrust T1 produced by the first propulsion device 12a. The moment about the center of gravity 60 is equivalent to the magnitude of the thrust vector T1 multiplied by dimension M1. Moment arm M1 is perpendicular to dashed line 68 along which the first thrust vector T1 is aligned. As such, it is one side of a right triangle which also comprises a hypotenuse H. It should also be understood that another right triangle in FIG. 5 comprises sides L, W/2, and the hypotenuse H. So long as the propulsion devices 12a, 12b are rotated about their respective steering axes 13a, 13b by the same angle θ, a moment arm M2 (not shown for purposes of clarity) of equal magnitude to moment arm M1 would exist with respect to the second thrust vector T2 directed along line 66.

With continued reference to FIG. 5, those skilled in the art will recognize that the length of the moment arm M1 can be determined as a function of steering angle θ; angle 1; angle 7C; the distance between the first and second steering axes 13a and 13b, which is equal to W in FIG. 5; and the perpendicular distance L between the center of gravity 60 and a line extending between the first and second steering axes 13a, 13b. The length of the line extending between the first steering axis 13a and the center of gravity 60 is the hypotenuse H of a right triangle and can easily be determined using the Pythagorean theorem given L and W, which are known and saved in the control module's memory. The magnitude of θ is calculated as described herein below with respect to equations 1-4. The magnitude of angle Ω is 90−θ. The magnitude of angle Φ is equivalent to the arctangent of the ratio of length L to the distance between the first steering axis 13a and the vessel's centerline 62, which is identified as W/2. The length of the moment arm M1 can be mathematically determined by the control module 24 using the length of line H and the magnitude of angle π (which is Ω−Φ)).

The thrust vectors T1, T2 each resolve into vector components in both the forward/reverse and left/right directions. The vector components, if equal in absolute magnitude to each other, may either cancel each other or be additive. If unequal in absolute magnitude, they may partially offset each other or be additive; however, a resultant force will exist in some linear direction. For purposes of explanation, FIG. 5 shows the vector components of the second thrust vector T2. As illustrated, second thrust vector T2 is oriented along line 66, which is at steering angle θ with respect to the centerline 62. The second thrust vector T2 can be resolved into components, parallel and perpendicular to centerline 62, that are calculated as functions of the steering angle θ. For example, the second thrust vector T2 can be resolved into a reverse-directed force F2Y and a side-directed force F2X by multiplying the second thrust vector T2 by the cosine of θ and the sine of θ, respectively. The vector components of the first thrust T1 can also be resolved into forward/reverse and side directed components in a similar manner. Using these relationships, the vector components FX, FY of the net thrust produced by the marine propulsion system 20 can be calculated by adding the respective forward/reverse and left/right vector components of T1 and T2:

$$FX=T1(\sin(\theta))+T2(\sin(\theta)) \quad (1)$$

$$FY=T1(\cos(\theta))-T2(\cos(\theta)) \quad (2)$$

Note that in the example of FIGS. 5 and 6, T1 has positive vector components in both the X and Y directions, while T2 has a positive vector component in the X direction and a negative vector component in the Y direction, which is therefore subtracted from the Y-directed vector component of T1. The net thrust acting on the vessel 10 can be determined by vector addition of FX and FY.

Turning to FIG. 6, a moment (represented by arrow 70) can also be imposed on the vessel 10 to cause it to rotate about its center of gravity 60. The moment 70 can be imposed in either rotational direction: clockwise (CW) or counterclockwise (CCW). The rotating force resulting from the moment 70 can be applied either in combination with a linear force on the vessel 10 or alone. In order to combine the moment 70 with a linear force, the first and second thrust vectors T1, T2 are aligned in generally opposite directions with their respective lines of action 68, 66 intersecting at the point 64 illustrated in FIG. 6. Although the construction lines are not shown in FIG. 6, effective moment arms M1, M2 exist with respect to the first and second thrust vectors T1, T2 and the center of gravity 60. Therefore, a moment is exerted on the vessel 10 as represented by arrow 70. If the thrust vectors T1, T2 are equal to each other in magnitude, are exerted along lines 68 and 66 respectively, and are symmetrical about the centerline 62 and in opposite directions, the net component forces parallel to the centerline 62 are equal to each other and therefore no net linear force is exerted on the vessel 10 in the forward/reverse direction. However, the first and second thrust vectors T1, T2 also resolve into forces perpendicular to the centerline 62, which in this example are additive. As a result, the marine vessel 10 in FIG. 6 will move to the right as it rotates in a clockwise direction in response to the moment 70.

If, on the other hand, it is desired that the moment 70 be the only force on the vessel 10, with no lateral movement in the forward/reverse or left/right directions, alternative first and second thrust vectors, represented by T1' and T2' in FIG. 6, are aligned parallel to each other along dashed lines 68' and 66', which are parallel to the centerline 62. The first and second thrust vectors T1', T2' are of equal magnitude and opposite direction. As a result, no net force is exerted on the vessel 10 in a forward/reverse direction. Because angle θ for both thrust vectors T1' and T2' is equal to 0 degrees, no resultant force is exerted on the vessel 10 in a direction perpendicular to the centerline 62. As a result, a rotation of the vessel 10 about its center of gravity 60 is achieved with no linear movement in either the forward/reverse or the left/right directions.

With reference to FIGS. 2-6, it can be seen that movement of the joystick handle 44 can be used by the operator of the vessel 10 to represent virtually any type of desired movement of the vessel 10. In response to receiving a signal from the joystick 30, an algorithm determines whether or not a rotation (shown by moment 70) about the center of gravity 60 is requested by the operator. If forward translation with no rotation is requested, the first and second propulsion devices 12a, 12b are oriented so that their thrust vectors align in a forward parallel orientation, as shown in FIG. 4, and so long as the magnitude and direction of T1 are equal to that of T2, the vessel 10 will travel in a forward direction. If, on the other hand, the signal from the joystick 30 indicates that a rotation about the center of gravity 60 is requested, the first and second thrust vectors T1, T2 are directed along lines 68 and 66 that do not intersect at the center of gravity 60, but instead intersect at another point 64 along the centerline 62. As shown in FIGS. 5 and 6, this intersection point 64 can be forward from the center of gravity 60. The thrusts T1 and T2 shown in FIG. 6 result in a clockwise rotation (shown by moment 70) of the vessel 10. Alternatively, if the first and second propulsion devices 12a, 12b are rotated so that they intersect at a point along the centerline 62 that is behind the center of gravity 60, an opposite effect could be realized, all else being equal. It should also be recognized that, with an intersection point 64 forward of the center of gravity 60, the directions of the first and second thrust vectors T1, T2 could be reversed to cause a rotation of the vessel 10 in a counterclockwise direction.

It should be noted that the steering angles of the propulsion devices 12a, 12b need not be the same. For example, the first propulsion device 12a can be steered to angle $\theta_1$ with respect to the centerline 62, while the second propulsion device 12b can be steered to angle $\theta_2$. When an input to the joystick 30 is made, the control module 24 will determine the net thrust and the net moment desired of the marine propulsion system 20 based on a map stored in the memory that correlates a given joystick input with a target linear thrust and a target moment about a preselected point. It can be seen, therefore, that T1, T2, $\theta_1$, and $\theta_2$ can thereafter be calculated by the control module 24 using the geometric relationships described hereinabove according to the following equations:

$$FX=T1(\sin(\theta_1))+T2(\sin(\theta_2)) \quad (1)$$

$$FY=T1(\cos(\theta_1))-T2(\cos(\theta_2)) \quad (2)$$

$$MCW=(W/2)(T1(\cos(\theta_1)))+(W/2)(T2(\cos(\theta_2))) \quad (3)$$

$$MCCW=L(T1(\sin(\theta_1)))+L(T2(\sin(\theta_2))) \quad (4)$$

$$MT=MCW-MCCW \quad (5)$$

where FX and FY are the vector components of the known target linear thrust, MT is the known total target moment (including clockwise moment MCW and counterclockwise moment MCCW) about the preselected point, and L and W/2 are also known as described above. The control module 24 then solves for the four unknowns (T1, T2, $\theta_1$, and $\theta_2$) using the four equations, thereby determining the steering angles, shift positions, and thrust magnitudes of each propulsion device 12a, 12b that will achieve the desired movement of the vessel 10. Note that equations 1-5 are particular to the thrust arrangements shown in FIGS. 5 and 6, and different vector components would contribute to clockwise or counterclockwise rotation and to forward/reverse or right/left translation given thrusts in different directions.

The above principles regarding resolution of the thrust vectors T1, T2 into X components and Y components in order to achieve lateral movement, rotational movement, or a combination of the two are the basis of a maneuvering algorithm of the present method. Not only is this maneuvering algorithm used in response to commands from the joystick 30 while in joysticking mode, it is also used to control rotational position, shift position, and thrust magnitude of the propulsion devices 12a, 12b while the vessel 10 operates in the station keeping mode. In other words, the control module 24 makes automatic corrections to each of these variables to maintain the vessel's heading and position while in station keeping mode in the same manner as if the operator were in fact manipulating the joystick to make such corrections. Similar methods could be used while in the autoheading or waypoint tracking modes described herein above.

Returning for a moment to FIG. 1, the vessel 10 can also be provided with one or more sensors 72, 74, 76, and 78. Although one sensor is shown on each of the bow, stern, and port and starboard sides of the vessel 10, fewer or more sensors could be provided at each location. The sensors 72-78 are distance and directional sensors. For example, the sensors could be radars, sonars, cameras, lasers, Doppler direction finders, or other devices individually capable of determining both the direction and distance of an object O near the vessel 10, such as a dock, seawall, slip, large rock or tree, etc. Alternatively, separate sensors could be provided for sensing direction than are provided for sensing distance, or more than one type of distance/direction sensor can be provided at a single location on the vessel 10. The sensors 72-78 provide information regarding both a direction of the object with respect to the marine vessel 10 and a shortest distance between the object O and the vessel 10. The sensors 72-78 provide this distance and direction information to the control module 24, such as by way of the CAN bus or wireless connections, as described herein above.

Regarding the sensors, 72, 74, 76, 78, note that different types of sensors may be used depending on the distance between the vessel 10 and the object O. For example, radar sensors may be used at further distances. Once the vessel 10 comes within a particular distance of the object, Lidar, ultrasonic, Leddar, or sonar sensors may instead be used. Camera sensors may be used in combination with any of the sensors mentioned above in order to provide additional information to the control module 24. Note that the sensors should be placed at optimal positions on the vessel 10 in order that they are at the correct height to detect objects the vessel 10 is likely to encounter. Note also that the control module 24 may select one of a plurality of sensors (including radars, Lidars, Leddars, sonics, and cameras) with which to sense the shortest distance and the direction of the object with respect to the vessel 10 based on a previously saved actual distance that was measured between the object O and the vessel 10. This way, the control module 24 knows which type of sensor is best for the next measurement.

In various situations, the vessel 10 may be approaching an object, such as a slip, dock, or sea wall. Often times, because of the precise control over translational and rotational movement of the vessel 10 provided in the joysticking mode, an operator will use the joysticking mode when approaching such objects in order to position the vessel 10 in a desired position with respect to the object without making contact with the object O. Additionally, once the operator has achieved a desired position with respect to the object O, the operator may place the vessel 10 in the station keeping mode, thereby causing the vessel 10 to maintain its position and heading while proximate the object O. During such operations, it is desirable for the vessel 10 to respond precisely as requested by the operator, in order to avoid collisions with the object O that could damage the vessel 10 and/or disturb passengers on board.

However, during research and development, the present inventors realized that there was a tendency for the vessel 10 to yaw (i.e., rotate) while the operator is requesting purely left/right or fore/aft translation without any rotation. Such unintended yaw occurs for various reasons, including, but not limited to, the propulsion devices 12a, 12b engaging the required gear(s) at different moments in time; unknown disturbance factors that are not easily measureable or accounted for, such as tide, current, wind, etc.; and/or inadvertent rotation of the handle 44 of the joystick 30 by the operator. Additionally, the joysticking mode becomes less intuitive as the vessel 10 moves closer to a visual reference point such as the object O, as the effects of unintended yaw tend to be more noticeable. Currently, an operator must attempt to correct for any unintended yaw him or herself, such as by rotating the joystick 30 to counteract the unintended yaw. The present inventors have instead developed an algorithm that automatically applies yaw corrections and controls an orientation of the vessel 10 with respect to the object O so as to maintain the orientation that existed when the joystick 30 was initially activated, absent clear intent of the operator to rotate the vessel 10.

FIG. 1 therefore illustrates a system for controlling movement of the marine vessel 10 near the object O, the vessel 10 being propelled by thrust generated by the marine propulsion system 20. The system includes, as described herein above, the control module 24 in signal communication with the marine propulsion system 20. The system also includes a manually operable input device, such as the joystick 30, providing to the control module 24 a signal representing a requested translation of the vessel 10. Such requested translation can be in the left/right or fore/aft direction. The system also includes at least one distance-measuring sensor 72, 74, 76, 78 providing to the control module 24 information about the object O that allows an actual angle between the vessel 10 and the object O to be determined.

Figure 7:
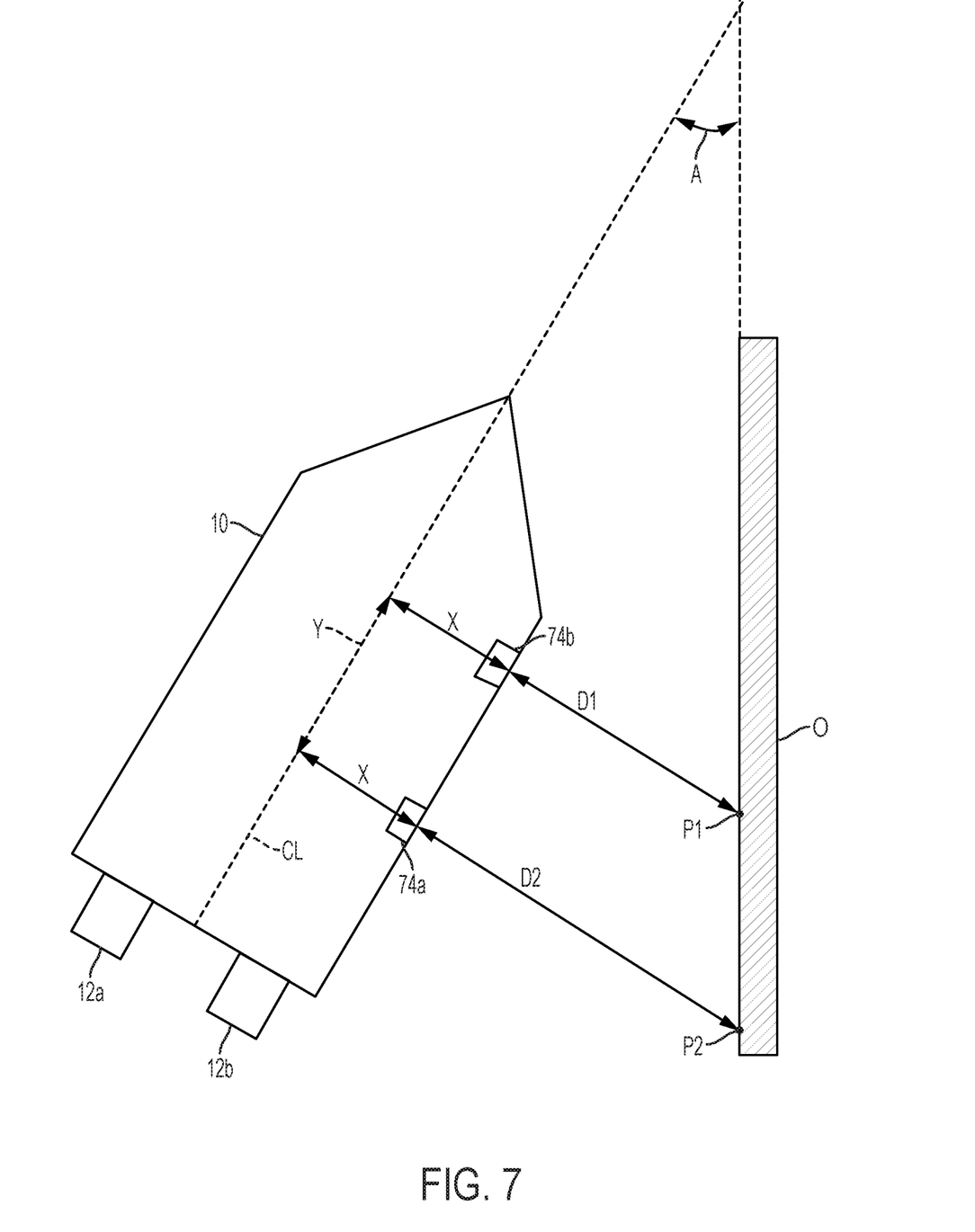
FIG. 7 illustrates an example of the marine vessel near an object.

Turning to FIG. 7, in one example, the at least one distance-measuring sensor (here sensors 74a and 74b) provides to the control module 24 at least a first distance D1 between the vessel 10 and a first point P1 on the object O and a second distance D2 between the vessel 10 and a second point P2 on the object O. (In other examples, many more reference points on the object's surface can be determined, depending on the type of sensor used.) Note that the control module 24 can thereafter determine a total distance between a center line CL of the vessel 10 and the points P1 and P2, respectively, based on a known value of X, which is the distance between the centerline CL and each of the sensors 74a, 74b. (Here, X is the same value for each sensor 74a and 74b, but the value could be different for each sensor depending on the design of the vessel and/or the locations of the sensors.) Another known value is that of Y, which is the distance between the sensor 74a and the sensor 74b along the centerline CL of the vessel 10. Using the now-known values D1+X and D2+X and the known value Y, the control module 24 can thereafter use known principals of trigonometry to determine an actual angle A between the vessel 10 and the object O.

Note that a single sensor, such as 74 shown in FIG. 1, could be used in order to determine both the distances D1 and D2, such as in the event that a beam or other signal emitted from the sensor 74 is split into zones in order to determine the two or more points P1, P2 on the object O. A best fit line can be drawn between the points P1, P2, etc. in order to approximate a closest edge of the object O. The angle A between the center line CL of the vessel 10 and the best fit line through the points P1, P2, etc. along the edge of the object O can then be determined, again using geometric principles. Note also that the above-described method for determining the angle A between the vessel 10 and the object O is merely exemplary, and other methods could be used. For instance, it is possible that the sensor 74 and/or sensors 74a, 74b could measure not only the distance to a point on the object O, but also an angle of the object with respect to the sensor(s), which could then be used to determine the angle A.

According to the present disclosure, in response to the signal representing the requested translation from the input device, such as the joystick 30, the control module 24 stores in its memory the actual angle A between the vessel 10 and the object O as an initial angle. The control module 24 then controls the marine propulsion system 20 to produce thrust with the propulsion devices 12a, 12b that will carry out the requested translation and that will maintain the initial angle between the vessel 10 and the object O. In other words, the initial angle is a target angle that the control module 24 aims to maintain between the vessel 10 and the object O, despite unintended yawing of the vessel 10 that would otherwise tend to change this angle.

In one example, the control module 24 repeatedly determines the actual angle A between the vessel 10 and the object O based on the first distance D1 and the second distance D2, as described herein above. The control module 24 determines whether a difference between the actual angle A and the initial angle, which was stored in response to the signal representing the requested translation from the joystick 30, was intended by the operator of the input device. In response to the difference between the actual angle A and the initial angle not being intended by the operator (as further described herein below), the control module 24 controls the marine propulsion system 20 to produce a corrective yaw moment with the above-noted thrust to minimize the difference between the actual angle A and the initial angle. In this way, the control module 24 is able to maintain the vessel 10 at the initial angle with respect to the object O, despite the above mentioned issues that cause inadvertent or unintended yaw.

The control module 24 may determine a magnitude of the above-mentioned corrective yaw moment in any given number of ways. In one example, a magnitude of the corrective yaw moment is proportional to the difference between the actual angle A and the initial (target) angle. For example, the control module 24 may input the difference between the actual angle A and the initial angle to a lookup table, which may return a corrective yaw moment magnitude to be produced by the propulsion devices 12a, 12b. In another example, the control module 24 may multiply the difference between the actual angle A and the initial angle by a predetermined factor in order to determine the magnitude of the corrective yaw moment. In general, in both of these instances, the magnitude of the corrective yaw moment will increase as the difference between the actual angle A and the initial angle increases, in order to counteract a greater error. In still another example, the magnitude of the corrective yaw moment is constant, and is a calibrated value that is independent of the angle error.

Note that the control module 24 controls the marine propulsion system 20 to produce the corrective yaw moment automatically, without intervention by the operator of the input device. It is intended, in fact, that the operator not be able to feel the slight corrections to the orientation of the vessel 10, but rather that such yaw corrections take pace frequently enough that their magnitudes are not very great and are therefore hardly able to be felt by the operator or those on board the vessel 10.

Figure 8:
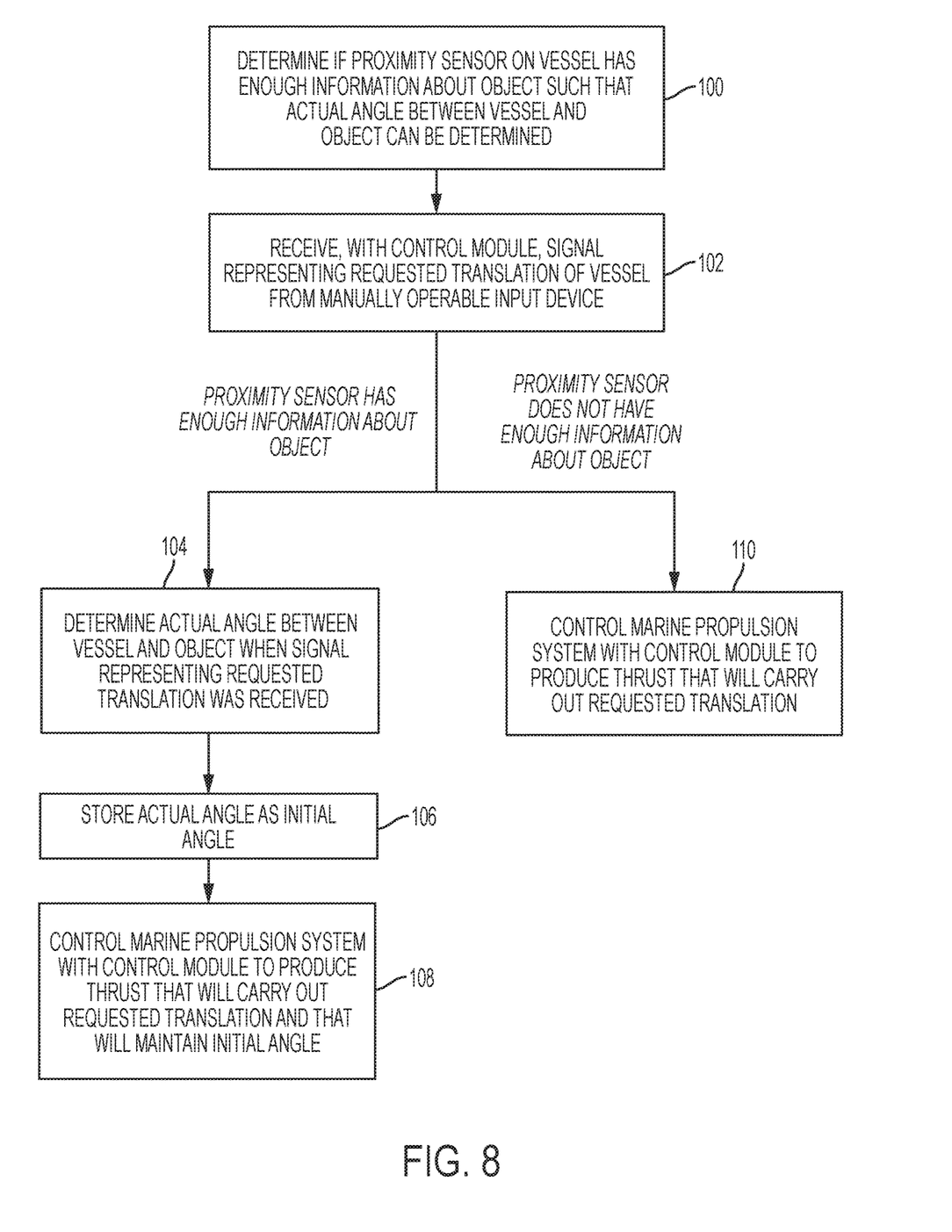
FIG. 8 illustrates a method according to the present disclosure for maneuvering a marine vessel near an object.

FIG. 8 illustrates one example of a method for controlling movement of the marine vessel 10 near the object O, the vessel 10 being propelled by thrust generated by a marine propulsion system 20 according to commands from the control module 24. The method includes, as shown at 100, determining if the sensor 72, 74, 74a, 74b, 76, 78 on the vessel 10 has enough information about the object O such that an actual angle A between the vessel 10 and the object O can be determined. This may require that the sensor continuously scans an area surrounding the vessel 10 to determine if both the first and second points P1 and P2 (FIG. 7) on the object O are within range, which range may vary depending on the type of sensor in question. As shown at 102, the method also includes receiving with the control module 24 a signal representing a requested translation of the vessel 10 from a manually operable input device, such as the joystick 30.

The method thereafter includes responding in one of the ways described as follows. In response to the sensor having enough information about the object O, the method includes, as shown at 104, determining the actual angle A between the vessel 10 and the object O when the signal representing the requested translation was received. This may be the actual angle A that was determined at the moment in time that the requested translation signal was received, or a few seconds before or after the signal was received. Specifically, the method may include determining at least a first point P1 and a second point P2 on the object O with the sensor; with the sensor, measuring a first distance D1 between the vessel 10 and the first point P1 and a second distance D2 between the vessel 10 and the second point P2; and calculating the actual angle A between the vessel 10 and the object O based on the first distance D1 and the second distance D2. As shown at 106, the actual angle A is then stored as an initial (target) angle to be automatically maintained. As shown at 108, the control module 24 then controls the marine propulsion system 20 to produce thrust that will carry out the requested translation and that will maintain the initial angle. For example, if the operator has requested right translation, the control module 24 will control the propulsion devices 12a, 12b to produce a resultant thrust that will propel the vessel 10 to the right, and, as needed, that will simultaneously automatically correct for any unintended yawing of the vessel 10. On the other hand, in response to the sensor not having enough information about the object O, the method includes, as shown at 110, controlling the marine propulsion system 20 with the control module 24 to produce thrust that will carry out the requested translation. In other words, the control module 24 does not have enough information in this latter instance to measure and then maintain the initial angle between the vessel 10 and the object O. Instead, the control module 24 will simply carry out the fore, aft, left, or right translation requested by the operator via the joystick 30 without any automatic yaw correction control.

Note that the order of boxes 100 and 102 does not matter, and that the steps in boxes 100 and 102 can be reversed or performed at the same time. However, in order for the corrective yaw algorithm of the present disclosure shown in boxes 104 to 108 to be enabled, both of the conditions at 100 and 102 must be met. In other words, there must be enough information from the sensor(s) about the object O for the control module 24 to calculate the actual angle A between the vessel 10 and the object O. However, it does not matter if this information is acquired before or after the signal representing the requested translation of the vessel is received. For example, the operator may be using the joystick 30 to translate the vessel 10 toward the object O, and once the sensors obtain enough information about the object O (e.g., are in range) that the actual angle A between the object O and the vessel 10 can be determined, the corrective yaw algorithm may commence. This is possible because the present method includes continuously scanning the area surrounding the vessel 10 with the sensor until the sensor has enough information about the object O such that the actual angle A between the vessel 10 and the object O can be determined. On the other hand, it may be that there is already enough information from the sensors about the object O to determine the actual angle A between the vessel 10 and the object O. However, it is not until the joystick 30 is activated to input a requested translation that the corrective yaw algorithm will commence.

Figure 9:
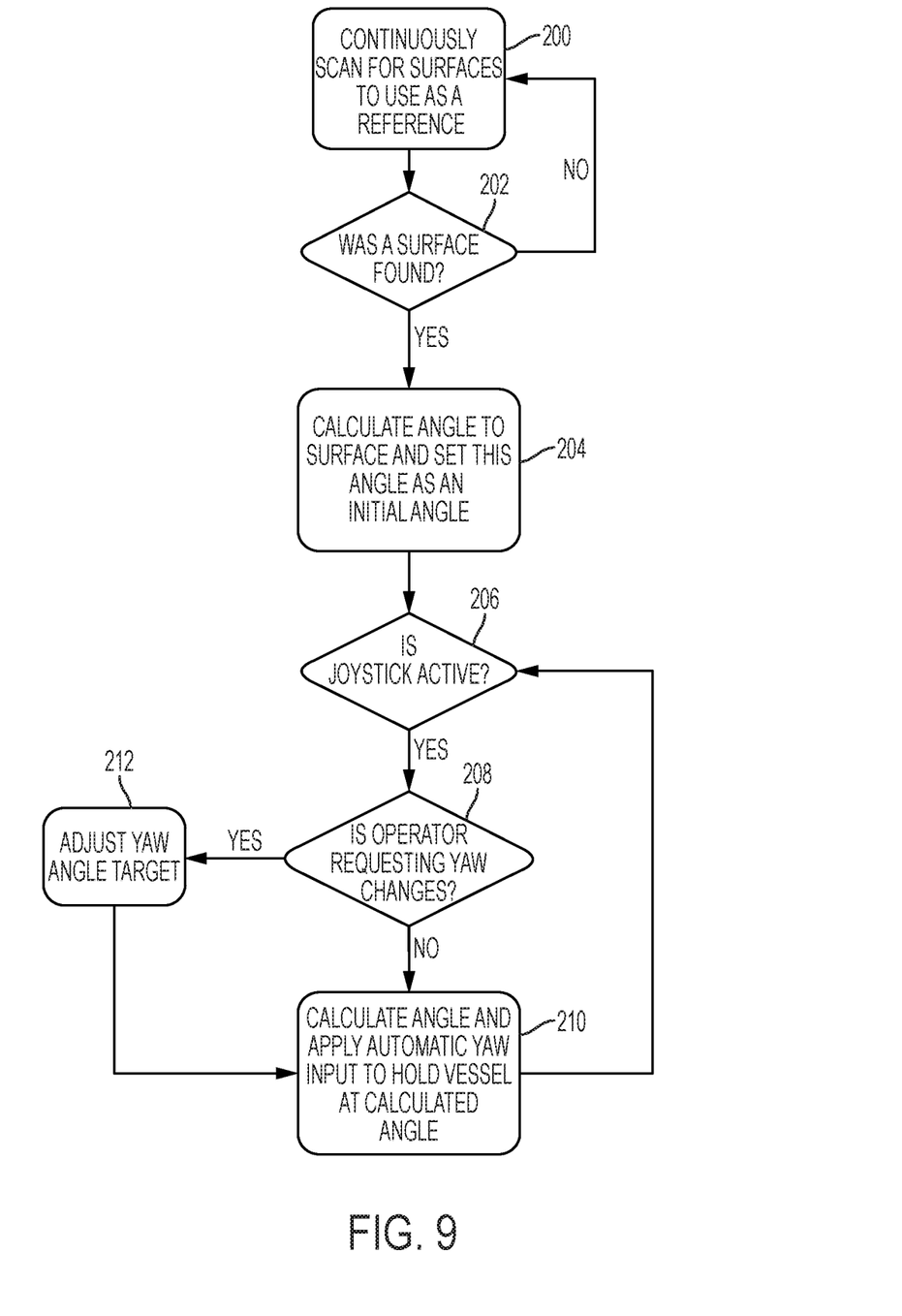
FIG. 9 illustrates another method according to the present disclosure for maneuvering a marine vessel near an object.

Of course, it may instead be the case that the operator is using the joystick 30 in the joysticking mode to purposefully request that the vessel 10 rotate. The method of FIG. 9 illustrates how the control module 24 handles such an instance. As shown at 200, as noted herein above, the sensor(s) continuously scan(s) for surfaces (e.g., points P1, P2) on the object O to use as a reference. At 202, the control module 24 determines whether a surface was found, i.e., whether enough information from the sensor exists to estimate a best fit line between two or more points on the object O. If NO, the method returns to 200, and the sensors continue to scan for surfaces to use as a reference. If YES at 202, the method continues to box 204, where the control module 24 calculates an angle A of the vessel 10 with respect to the surface of the object O, as described herein above with respect to FIG. 7, and then sets this angle A as the initial angle that is to be maintained with respect to the object O.

Next, at 206, the control module 24 determines if the joystick 30 is active. For example, the control module 24 may accept a signal representing a requested yaw moment of the vessel 10 from the input device (e.g., joystick 30). The control module 24 may determine that the joystick 30 is active in response to any non-zero input from the joystick 30. If NO at 206, the method may wait at 206 or may return to 200. If YES at 206, the method continues to 208, where the control module 24 determines if the operator is requesting a yaw moment. To make this determination, the control module 24 may compare the requested yaw moment from the joystick 30 to a predetermined yaw moment threshold. In response to determining that the requested yaw moment is less than the threshold, the control module 24 may control the marine propulsion system 20 to produce the thrust that will carry out the requested translation and that will maintain the initial angle between the vessel 10 and the object O. The yaw moment threshold may be a calibrated and stored value that is relatively small, such as between 0° and 5° rotation of the handle 44 about axis 48, and therefore represents merely inadvertent rotation of the handle 44 of the joystick 30, rather than a true request from the operator to rotate the vessel 10. When the requested yaw moment is less than this threshold, the control module 24 is programmed to assume that the operator did not intend to rotate the joystick 30 or the vessel 10, and therefore the control module 24 will not act upon the requested yaw moment. Rather, the control module 24 will carry out the above-described corrective yaw algorithm to produce corrective yaw moments, if necessary, to counteract unintended yaw of the vessel 10. This is shown at box 210.

On the other hand, if at 208 the control module 24 determines that the operator is requesting yaw, the method continues to 212, and the control module 24 adjusts the target angle between the vessel 10 and the object O. Specifically, the method includes controlling the marine propulsion system 20 to produce thrust that will carry out the requested translation (i.e., left/right or fore/aft) and that will produce the requested yaw moment (input via the joystick 30) in response to determining that the requested yaw moment is greater than or equal to the above-noted threshold. In this case, the control module 24 is programmed to assume that the relatively greater rotation of the handle 44 about axis 48 is purposefully meant to change the orientation of the marine vessel 10 with respect to the object O. After the marine propulsion system 20 produces the thrust that produces the requested yaw moment, the vessel 10 will have rotated to a new angle with respect to the object O. Generally, once this new angle is achieved, the operator will stop rotating the joystick 30 and allow it to return to its neutral rotational position. Thus, in response to the requested yaw moment falling back below the yaw moment threshold (e.g., when the joystick returns to neutral), the method includes using the information from the sensor to determine a subsequent angle between the vessel 10 and the object O. It is assumed that after the requested yaw moment falls back below the threshold, the operator is finished intentionally rotating the marine vessel 10, and any rotation thereafter is not intended. The method thereafter includes controlling the marine propulsion system 20 to produce thrust that will carry out the requested translation and that will maintain the subsequent angle of the vessel 10 with respect to the object O. In other words, the corrective yaw algorithm described herein above is carried out using the subsequent angle as the new target angle of the vessel 10 with respect to the object O.

Note that in the examples described above, several assumptions are made in order to simplify description of the corrective yaw algorithm. For instance, the sensors 74a, 74b shown in FIG. 7 as determining the distances D1, D2 between the vessel 10 and the object O are both shown as being on the starboard side of the vessel 10. Of course, if the port side of the vessel 10 were approaching the object O, sensors on the port side of the vessel 10 would instead be used. Additionally, it may be desirable to use sensors more towards the bow or stern of the vessel 10 than those shown schematically herein in order to obtain the most accurate best fit line between the points detected on the object O. It should be understood that use of the center line CL of the vessel 10 as a reference line or "center of navigation" is also an arbitrary choice made during setup, and other reference points on the vessel 10 could be used for calculating the angle A between the vessel 10 and the best fit line along the nearest surface of the object O.

Additionally, the above examples were described with respect to left/right translation inputs to the joystick 30. A similar algorithm could be used for any fore/aft translation inputs and/or diagonal translation inputs as described herein above with respect to FIG. 3. In such instances, the angle A may instead be determined between the bow or stern of the vessel 10 and an object that is in front of or behind the vessel 10. For example, if the vessel 10 were backing towards a dock or seawall, sensors on the stern of the vessel 10 could be used in order to calculate the angle of the transom with respect to the object O.

Additionally, setting of the subsequent target angle of the vessel 10 with respect to the object O was described as occurring by way of measurement of the actual angle between the vessel 10 and the object O. In another example, the control module 24 could calculate the subsequent target angle between the vessel 10 and the object O based on an amount by which the operator requested that the orientation of the vessel 10 be changed. For example, in some systems, a single tap, click, or rotation to a detent position of the joystick 30 represents a request for a 1, 2, or x degree change in heading of the vessel 10. The control module 24 could therefore calculate the subsequent angle by adding or subtracting, as appropriate, this change in heading angle to or from the stored initial target angle.

Finally, note that control of the marine propulsion system 20 by the control module 24, as far as the individual thrusts of the propulsion devices 12a, 12b are concerned, is performed in the same manner as described herein above with respect to FIGS. 4-6 and Equations (1)-(5). In other words, the control module 24 simply accounts for both the requested lateral translation in the fore/aft and/or left/right directions while at the same time summing in any corrective yaw moment that is necessary to counteract any unintended yaw of the marine vessel 10. The corrective yaw moment is determined based on feedback from the sensor(s), which allows the control module 24 to determine when there is a difference between the actual angle and initial (target) angle of the vessel 10 with respect to the object O and a corrective yaw moment is therefore needed. For example, if the control module 24 determines that the actual angle A between the vessel 10 and the object O is greater than the initial angle, the control module 24 will determine a corrective yaw moment according to one of the methods described herein above, which corrective yaw moment will rotate the vessel 10 in a direction tending to decrease the actual angle A between the vessel 10 and the object O. The control module 24 will determine the thrusts needed from each propulsion device 12a, 12b using the Equations (1)-(5) above, with the corrective yaw moment serving as the "MT" in Equation (5). After the vessel 10 rotates, the control module 24 will re-calculate the actual angle A to determine if it is within a threshold of the initial target angle. If so, no further yaw is needed at that time. If not, the control module 24 may produce thrust that produces another yaw moment in a further attempt to minimize the difference between the actual angle and the initial angle. This continues until the initial target angle between the vessel 10 and the object O is achieved. Seeing as any such corrections are instantaneous and automatic, and therefore likely to be relatively small, the operator experiences this as the vessel 10 maintaining its initial orientation with respect to the object O.

In the above description certain terms have been used for brevity, clarity and understanding. No unnecessary limitations are to be implied therefrom beyond the requirement of the prior art because such terms are used for descriptive purposes only and are intended to be broadly construed. The different systems and methods described herein above may be used in alone or in combination with other systems and methods. Various equivalents, alternatives and modifications are possible within the scope of the appended claims. While each of the method claims includes a specific series of steps for accomplishing certain control system functions, the scope of this disclosure is not intended to be bound by the literal order or literal content of steps described herein, and non-substantial differences or changes still fall within the scope of the disclosure.

What is claimed is:

1. A method for controlling movement of a marine vessel near an object, the vessel being propelled by thrust generated by a marine propulsion system according to commands from a control module, the method comprising:

determining if a distance sensor on the vessel is within range of at least first and second points on the object such that an actual angle between the vessel and the object can be determined;

receiving, with the control module, a signal representing a requested translation of the vessel from a manually operable input device; and thereafter doing one of the following:
in response to the distance sensor being within range of the at least first and second points on the object, determining the actual angle between the vessel and the object when the signal representing the requested translation was received, storing the actual angle as an initial angle, and controlling the marine propulsion system with the control module to produce thrust that will carry out the requested translation and that will maintain the initial angle; or in response to the distance sensor not being within range of the at least first and second points on the object, controlling the marine propulsion system with the control module to produce thrust that will carry out the requested translation.

2. The method of claim 1, further comprising accepting, with the control module, a signal representing a requested yaw moment of the vessel from the input device;
comparing the requested yaw moment to a predetermined yaw moment threshold; and
in response to determining that the requested yaw moment is less than the threshold, controlling the marine propulsion system to produce the thrust that will carry out the requested translation and that will maintain the initial angle.

3. The method of claim 2, further comprising controlling the marine propulsion system to produce thrust that will carry out the requested translation and that will produce the requested yaw moment in response to determining that the requested yaw moment is greater than or equal to the threshold.

4. The method of claim 3, wherein after the marine propulsion system produces the thrust that produces the requested yaw moment, the method further comprises:
in response to the requested yaw moment falling back below the threshold, using information from the distance sensor to determine a subsequent angle between the vessel and the object; and
thereafter controlling the marine propulsion system to produce thrust that will carry out the requested translation and that will maintain the subsequent angle.

5. The method of claim 1, wherein in response to the distance sensor being within range of the at least first and second points on the object, the method further comprises:
repeatedly determining the actual angle between the vessel and the object using information from the distance sensor;
determining whether a difference between the actual angle and the initial angle was intended by an operator of the input device; and
in response to the difference not being intended by the operator, producing a corrective yaw moment with the thrust to minimize the difference.

6. The method of claim 5, wherein a magnitude of the corrective yaw moment is proportional to the difference between the actual angle and the initial angle.

7. The method of claim 5, wherein the control module controls the marine propulsion system to produce the corrective yaw moment automatically, without intervention by the operator.

8. The method of claim 1, further comprising continuously scanning an area surrounding the vessel with the distance sensor until the distance sensor is within range of the at least first and second points on the object such that the actual angle between the vessel and the object can be determined.

9. The method of claim 1, further comprising:
with the distance sensor, measuring a first distance between the vessel and the first point on the object and a second distance between the vessel and the second point on the object; and
calculating the actual angle between the vessel and the object based on the first distance and the second distance.

10. The method of claim 1, wherein the requested translation is left or right lateral translation of the vessel.

11. A system for controlling movement of a marine vessel near an object, the vessel being propelled by thrust generated by a marine propulsion system, the system comprising:
a control module in signal communication with the marine propulsion system;
a manually operable input device providing to the control module a signal representing a requested translation of the vessel; and
at least one sensor providing to the control module at least a first distance between the vessel and a first point on the object and a second distance between the vessel and a second point on the object;
wherein the control module determines an actual angle between the vessel and the object based on the first distance and the second distance; and
wherein, in response to the signal representing the requested translation, the control module stores the actual angle between the vessel and the object as an initial angle and controls the marine propulsion system to produce thrust that will carry out the requested translation and that will maintain the initial angle.

12. The system of claim 11, wherein:
the control module determines a yaw moment requested via the input device;
the control module compares the requested yaw moment to a predetermined yaw moment threshold; and
in response to determining that the requested yaw moment is less than the threshold, the control module controls the marine propulsion system to produce the thrust that will carry out the requested translation and that will maintain the initial angle.

13. The system of claim 12, wherein, in response to determining that the requested yaw moment is greater than or equal to the threshold, the control module controls the marine propulsion system to produce thrust that will carry out the requested translation and that will produce the requested yaw moment.

14. The system of claim 13, wherein:
after the marine propulsion system produces the thrust that produces the requested yaw moment, and in response to the requested yaw moment falling back below the threshold, the control module determines a subsequent angle between the vessel and the object based on the first distance and the second distance; and
the control module thereafter controls the marine propulsion system to produce thrust that will carry out the requested translation and that will maintain the subsequent angle.

15. The system of claim 11, wherein:
the control module repeatedly determines the actual angle between the vessel and the object based on the first distance and the second distance;
the control module determines whether a difference between the actual angle and the initial angle was intended by an operator of the input device; and
in response to the difference not being intended by the operator, the control module controls the marine propulsion system to produce a corrective yaw moment with the thrust to minimize the difference.

16. The system of claim 15, wherein a magnitude of the corrective yaw moment is proportional to the difference between the actual angle and the initial angle.

17. The system of claim 15, wherein the control module controls the marine propulsion system to produce the corrective yaw moment automatically, without intervention by the operator.

18. The system of claim 11, wherein the at least one sensor continuously scans an area surrounding the vessel to determine if both the first and second points on the object are within range.

19. The system of claim 11, wherein the requested translation is left or right lateral translation of the vessel.

20. The system of claim 11, wherein the input device is a joystick.

* * * * *